ELECTRONIC CONTROLLER
Filed Oct. 6, 1958
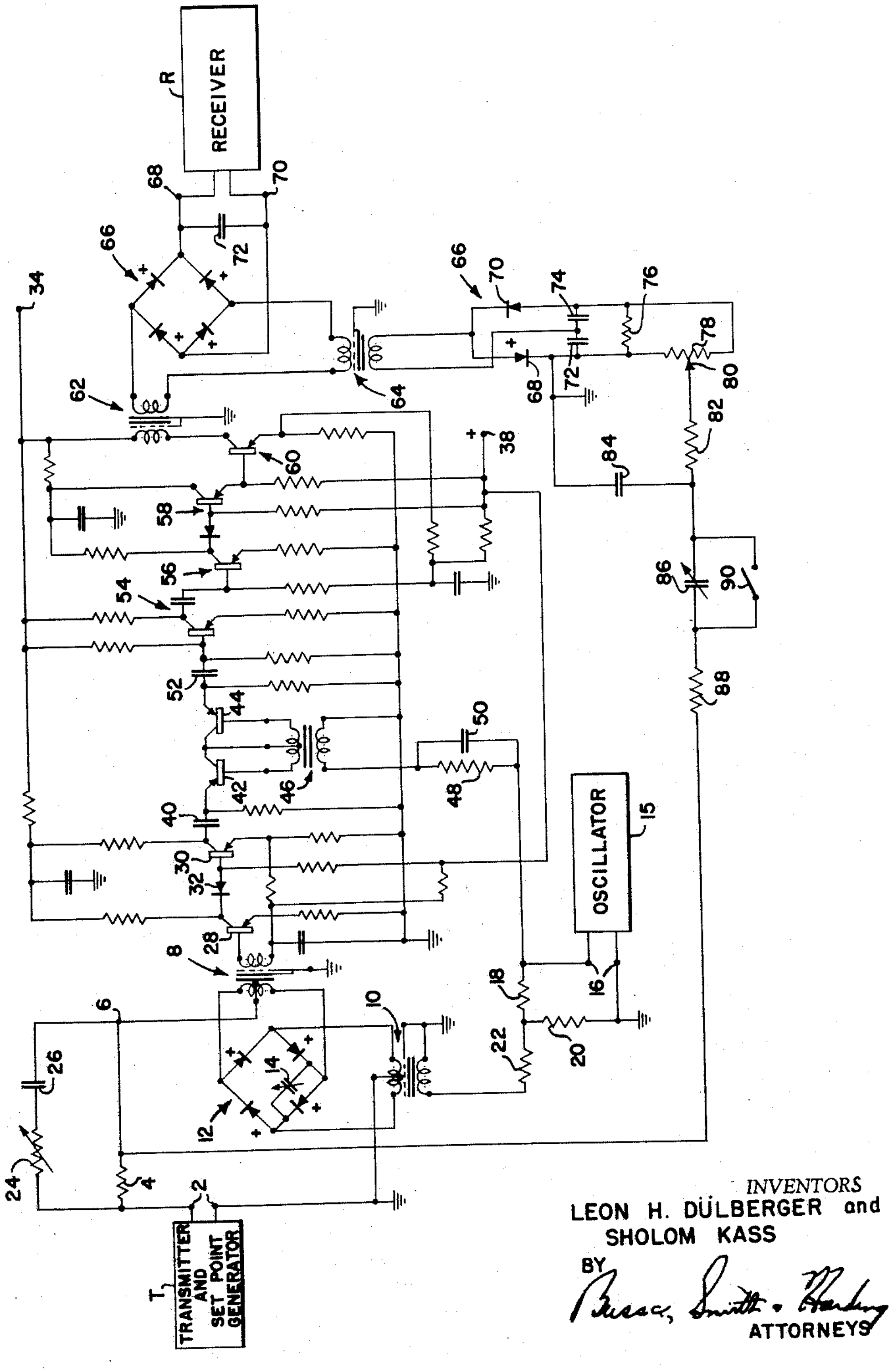
INVENTORS
LEON H. DÜLBERGER and
SHOLOM KASS
BY Busser, Smith & Harding
ATTORNEYS 3,005,163
Patented Oct. 17, 1961

3,005,163

ELECTRONIC CONTROLLER

Leon H. Dülberger, Holicong, and Sholom Kass, Philadelphia, Pa., assignors to Fischer & Porter Company, Hatboro, Pa., a corporation of Pennsylvania Filed Oct. 6, 1958, Ser. No. 765,582
12 Claims. (Cl. 330—10)

This invention relates to an electronic controller for process or other control.

Various attempts have been made to provide electronic controllers having the satisfactory characteristics of the commonly used pneumatic controllers. One of the essentials of a process controller is the provision of means for providing large time constants for so-called floating control, and such time constants may be readily provided in pneumatic apparatus. In contrast, large time constants are difficult to secure electrically consistently with stability against temperature and humidity conditions and variations in supply voltage and component characteristics. Unless electronic apparatus is capable of operating with input signals of very small magnitudes, either extremely high resistances or very large capacitors rated for high voltages are required for securing the necessary time constants consistently with usable currents or voltages. Accordingly, electronic controllers have generally been bulky and costly, requiring extreme precautions to maintain stability and reliability of operation of their vacuum tube circuits.

In accordance with the present invention, electronic controllers may be provided having all of the satisfactory operating characteristics of pneumatic controllers, being stable and simple in construction. In accordance with the invention, a controller is provided which is completely transistorized with avoidance of vacuum tubes which are particularly difficult to maintain in satisfactory operation under the conditions required in controllers. Minute currents are involved in the input and due to that fact time constant devices may be provided which utilize inexpensive, small standard and readily available components. Furthermore, by the adoption of the principles involved in the invention high stability is secured with completely satisfactory independence of supply voltage variations, temperature, humidity conditions, aging and variations in characteristics of components.

The objects of the present invention relate to the attainment of the foregoing, and will become more apparent from the following description, read in conjunction with the accompanying drawing, in which the figure is a wiring diagram of a preferred form of controller provided in accordance with the invention.

The controller herein disclosed is of general purpose type and is adapted to receive its input from any type of transmitter and set point generator T which will provide a small electrical error current as a function of the variable to be controlled. As will more fully appear, the input error current is of the order of a fraction of a microampere introduced through a very high resistance by a transmitter and set point generator providing a reasonable voltage at small current. As examples of transmitters, there may be cited for temperature measurement a thermocouple provided with a chopper amplifier to provide a direct current output, for measurement of position or force a transmitting slide wire arrangement or a differential transformer followed by an amplifier and rectifier combination, or the like, the requirement being a direct current signal source as a function of the variable to be controlled. A set point generator consists of a D.C. supply adjusted to an appropriate fraction of the transmitter full scale output. The error signal is equal to the transmitter output minus the set point voltage.

This error signal input is delivered to the terminals 2, one of which is grounded, the other being connected through a high resistance 4 to a current summing point 6 which may be regarded as the principal input terminal of the controller. In the case of most transmitters the resistor 4 may be of the order of 10 to 100 megohms, the input voltage at terminals 2 being of a suitable value to provide through such a resistor a current which for best operation is of the order of 0.001 to a few microamperes. As will appear more fully hereafter, such a small input signal current is desirable consistently with the use of suitable components for production of large time constants.

The junction point or terminal 6 is connected to the center tap of the primary of a transformer 8 which serves for both isolation and impedance matching. A ground connection is made to the center tap of the secondary of a transformer 10. A ring modulator is provided at 12 in the form of a bridge consisting of four silicon diodes connected in series as illustrated. Desired low output from this modulator is provided by selection of the diodes to provide a balanced bridge, the balance of which may be further adjusted by the provision across one or more of them of a small adjustable capacitor 14. Diodes of the IN458 type have been found particularly suitable for this purpose. Two of the opposite terminals of the bridge are connected to the terminals of the primary of transformer 8, while the other two terminals are connected to the ends of the secondary of transformer 10.

Alternating current excitation of the modulator is provided from an oscillator 15, which may be of a conventional transistor type, through terminals 16 and the voltage dividing arrangement of resistors 18 and 20 and through resistor 22 to one terminal of the primary of transformer 10, the other terminal of which primary is grounded. The excitation frequency provided by the oscillator 15 is subject to quite arbitrary choice, but one kilocycle per second has been found quite satisfactory, with an input across the secondary of transformer 10 to the modulator having a value of several hundred millivolts. Operation is such that the small alternating voltages applied to the diodes vary their forward resistance at the toe of their static characteristic curve and their junction capacity as well. Introduction of very small direct currents into the input circuit produces a useful alternating current signal at the secondary of the transformer 8.

By selection of the diodes and final balancing by capacitor 14, and by electromagnetic and electrostatic shielding of the parts so far described, the zero input signal delivered from the transformer 8 may be kept very low. The particular operation of the bridge modulator need not be described in detail, but it will be evident that when direct current flows between the input terminals 2 an unbalance occurs to provide an output through transformer 8 which is alternating and proportional to the direct current. This proportionality is maintained so long as to the direct error signal current and the alternating exciting current for the modulator are kept small so that the diodes operate at the toes of their static characteristics.

Rate control is provided by the series arrangement of a variable resistor 24 and a capacitor 26 in parallel with the resistor 4 between terminal 2 and junction point 6. Values of these elements may be chosen in conjunction with that of resistor 4 to secure the proper amount of rate control. As will be evident, a differentiating action takes place which is added to the proportional action at the junction point.

The transformer 8 feeds a preamplifier which comprises the transistors 28 and 30 in a conventional amplifier circuit involving direct and alternating current feedback to maintain the operating point and provide independence of gain with respect to component characteristics, supplied voltage and temperature variations. A diode 32 between the transistors serves to maintain a D.C. voltage difference between the transistors to allow the establishment of a desirable operating point. The preamplifier is followed by a synchronous protector circuit which is phase locked with the exciting alternating current carrier to provide a gating action with reference to the polarity of the direct current input signal from the transmitter T. The purpose of this protector gate is to avoid passage of a signal through the amplifier when the input direct current is of the wrong polarity, thus to prevent false output and the locking of the amplifier in a positive feedback state considering the application of an external feedback loop referred to later. Signals are fed to the protector gating arrangement through the capacitor 40. The gate is provided by a pair of transistors 42 and 44 receiving a reference signal from the transformer 46, the primary of which is supplied from the upper terminal 16 through the phase adjusting network comprising the resistor 48 and capacitor 50, which are chosen to secure the desired reference signal. The gating arrangement is such that only signals corresponding to a positive potential at junction 6 are passed by the gate.

The signal from the gating arrangement is delivered through capacitor 52 to a transistor amplifying stage indicated at 54, the amplier stage being in the form of a feedback stabilized circuit.

The output from the last mentioned amplifier is further amplified in a power amplifier which comprises the transistors 56, 58 and 60, the last being a power transistor. Both direct and alternating feedbacks are here again used to insure stability of gain and operating point with respect to variations in temperature and characteristics of components. Desirably, the power gain is sufficient to bring the signal level upwards of one watt. A step-up transformer 62 applies the output of the power transistor to a bridge rectifier circuit indicated at 66. The output of this rectifier is applied between terminals 68 and 70 to a receiver R which is direct current operated and might typically be an electrical valve positioner or other device used for process control. Alternating components of the rectifier output are effectively filtered out by the capacitor 72 shunted across the terminals 68 and 70. This capacitor 72 may also be chosen to satisfy response time requirements.

For reset, i.e., proportional and floating action, a direct voltage is desired which is a function of the direct current in the load circuit and independent of the load resistance. This is obtained by providing in series with the signals supplied to the bridge 66 the primary of a transformer 64, the secondary of which feeds a voltage doubling circuit 66 which comprises the rectifying diodes 68 and 70 in combination with the capacitors 72 and 74 and the shunting resistors 76. A filtered direct voltage proportional to the load current is thus obtained across the potentiometer resistance 78 which shunts the resistor 76. Typically the voltage doubler provides 150 volts D.C. when full current output to the receiver occurs. The adjustable contact 80 provides proportional band control. Current from the adjustable contact 80 is provided through resistor 82 which has a return to ground through the capacitor 84. The current, with switch 90 closed, is provided through a high resistance 88 to the junction point 6. When the switch 90 is closed an adjustable capacitor 86 is short circuited and proportional action is provided. When the switch 90 is opened, floating action is added by reason of the charging of capacitor 86. Polarities are so chosen as to provide negative feedback. Increased direct current feedback reduces the overall gain and thus increases the proportional band setting. By adjusting the capacitor 86 (which instead of being a physically adjustable capacitor may be provided by a number of fixed capacitors selectable into the circuit, since generally the capacitance value is desirably of the order of 0.1 to 40 microfarads) the floating action may be adjusted. It has been found that delays of greater than one hour may be obtained with complete stability of the circuit. It will be evident that various resistance-capacitance networks may be provided between the adjustable contact 80 and the junction point 6.

It will now be evident that the phase suppressing action provided by the gating arrangemnet including the transistors 42 and 44 is necessary, since a signal at junction point 6 of undesired polarity would provide positive feedback through the connection between potentiometer contact 80 and the junction point 6 inasmuch as the feedback is derived from alternating current rectification. By blocking alternating signals which are not of the desired phase negative feedback action is assured.

By reason of the fact that very low direct currents are required to operate the ring modulator 12 extremely high values of resistances may be used as already noted. This, in turn, makes it possible to employ practical capacitance values at reasonable voltage breakdown ratings.

The overall operation is thus comparable with that of conventional pneumatic controllers. High stability is secured independent of component characteristics, temperature and humidity conditions. By reason of the use of transistors the apparatus may be made very compact and reliable, not being subject to interruptions of operation as are involved in the use of vacuum tubes.

It will be evident that various changes in details of circuitry may be adopted without departing from the invention. For example, various specific types of amplifiers may be used, the protector gate may be otherwise provided, and the adjustable feedback potential and arrangements for reset control may be provided in other fashions than specifically shown herein. It will accordingly be appreciated that the invention is not to be regarded as limited except as required by the following claims.

What is claimed is:

1. Control apparatus comprising a diode bridge, means providing alternating excitation to said bridge, means providing a direct current error signal to said bridge, said bridge being balanced to provide an alternating output substantially proportional to the magnitude of said direct current error signal, the alternating excitation of said bridge and the magnitudes of the direct current signals provided thereto being such that the diodes of the bridge operate at the toes of their static characteristics, amplifying means receiving the alternating output of said bridge and including synchronous protector means suppressing signals resulting from direct current signals of one sign and passing signals resulting from direct current signals of the opposite sign, means supplying alternating reference signals to said synchronous protector means from said means providing alternating excitation to said bridge, a rectifier receiving alternating signals from said amplifying means and providing a direct current output, means responsive to alternating signals supplied to said rectifier and providing to a terminal a direct potential substantially proportional to the alternating signals supplied to said rectifier, and a connection including a resistance between said terminal and said diode bridge to provide negative feedback to said bridge.

2. Control apparatus according to claim 1 in which the last mentioned connection includes a capacitor in series with said resistance.

3. Control apparatus according to claim 1 in which said means providing a direct current signal to said bridge includes a differentiating circuit.

4. Control apparatus according to claim 2 in which said means providing a direct current signal to said bridge includes a differentiating circuit.

5. Control apparatus comprising a diode bridge, means providing alternating excitation to said bridge, means providing a direct current signal to said bridge, said bridge being balanced to provide an alternating output substantially proportional to the magnitude of said direct current signal, the alternating excitation of said bridge and the magnitudes of the direct current signals provided thereto being such that the diodes of the bridge operate at the toes of their static characteristics, amplifying means receiving the alternating output of said bridge, a rectifier receiving alternating signals from said amplifying means and providing a direct current output, means responsive to alternating signals supplied to said rectifier and providing to a terminal a direct potential substantially proportional to the alternating signals supplied to said rectifier, and a connection including a resistance between said terminal and said diode bridge to provide negative feedback to said bridge.

6. Control apparatus according to claim 5 in which the last mentioned connection includes a capacitor in series with said resistance.

7. Control apparatus according to claim 5 in which said means providing a direct current signal to said bridge includes a differentiating circuit.

8. Control apparatus according to claim 6 in which said means providing a direct current signal to said bridge includes a differentiating circuit.

9. Control apparatus comprising a diode bridge, means providing alternating excitation to said bridge, means providing a direct current signal to said bridge, said bridge being balanced to provide an alternating output substantially proportional to the magnitude of said direct current signal, the alternating excitation of said bridge and the magnitudes of the direct current signals provided thereto being such that the diodes of the bridge operate at the toes of their static characteristics, amplifying means receiving the alternating output of said bridge, means responsive to alternating output of said amplifying means and providing to a terminal a direct potential substantially proportional to the alternating signals supplied by said amplifying means, and a connection including a resistance between said terminal and said diode bridge to provide negative feedback to said bridge.

10. Control apparatus according to claim 9 in which the last mentioned connection includes a capacitor in series with said resistance.

11. Control apparatus according to claim 9 in which said means providing a direct current signal to said bridge includes a differentiating circuit.

12. Control apparatus according to claim 10 in which said means providing a direct current signal to said bridge includes a differentiating circuit.

References Cited in the file of this patent

UNITED STATES PATENTS

| | | |
|---|---|---|
| 2,324,815 | Black | July 10, 1943 |
| 2,780,778 | Root et al. | Feb. 5, 1957 |
| 2,956,234 | Olsen | Oct. 11, 1960 |